Aug. 1, 1939.  W. R. PERRY  2,168,071
CONSTANT TENSION WINDING CONTROL
Filed May 18, 1936    2 Sheets-Sheet 1

INVENTOR.
William R Perry,
BY
Hood + Hahn.
ATTORNEYS.

Aug. 1, 1939.   W. R. PERRY   2,168,071
CONSTANT TENSION WINDING CONTROL
Filed May 18, 1936   2 Sheets-Sheet 2

INVENTOR.
William R. Perry
BY
Hood + Hahn.
ATTORNEYS.

Patented Aug. 1, 1939

2,168,071

UNITED STATES PATENT OFFICE 2,168,071

CONSTANT TENSION WINDING CONTROL

William R. Perry, Columbus, Ind., assignor to Reeves Pulley Company, Columbus, Ind., a corporation of Indiana Application May 18, 1936, Serial No. 80,243

25 Claims. (Cl. 242—75)

The present application relates to constant tension winding controls, and more particularly, to controls, automatic in character, for varying the speed at which a winding roll is driven, as the effective diameter of that roll increases, to maintain constant the tension of the material being wound upon the roll.

It is an object of the present invention to provide, in an organization comprising a feeding roll and a winding roll, the former being driven at constant speed and the latter being driven through a variable speed transmission of the incremental type, automatic means for controlling the output speed of said transmission in accordance with the tension in the material being wound, in order to maintain that tension constant. Otherwise stated, it is an object of the invention to provide automatic control means for a variable speed transmission, said control means being operable to vary the output speed of the transmission in accordance with variations of the torque delivered by said transmission. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
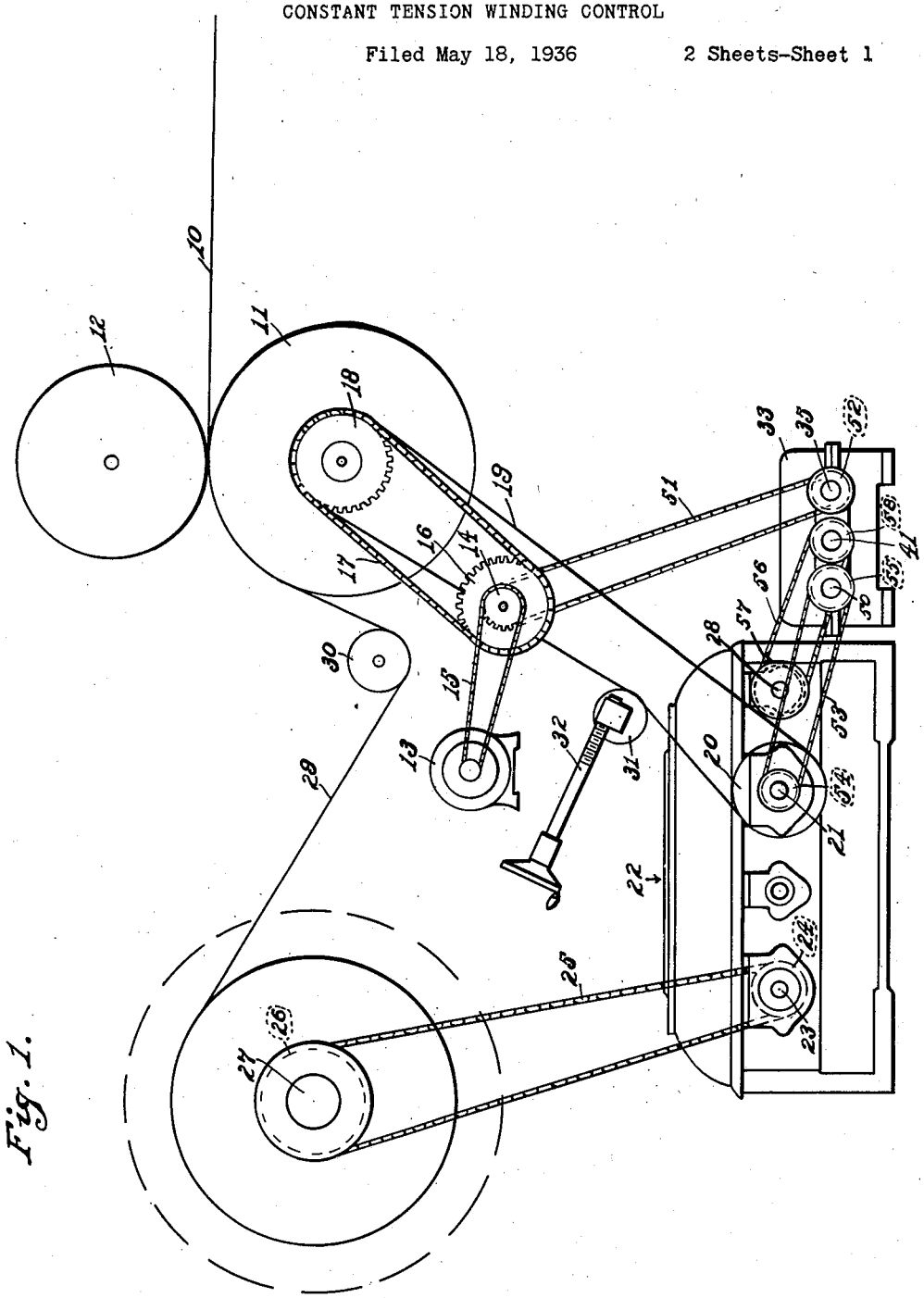
Fig. 1 is a more or less diagrammatic view of an organization constructed in accordance with the present invention.
Figure 2:
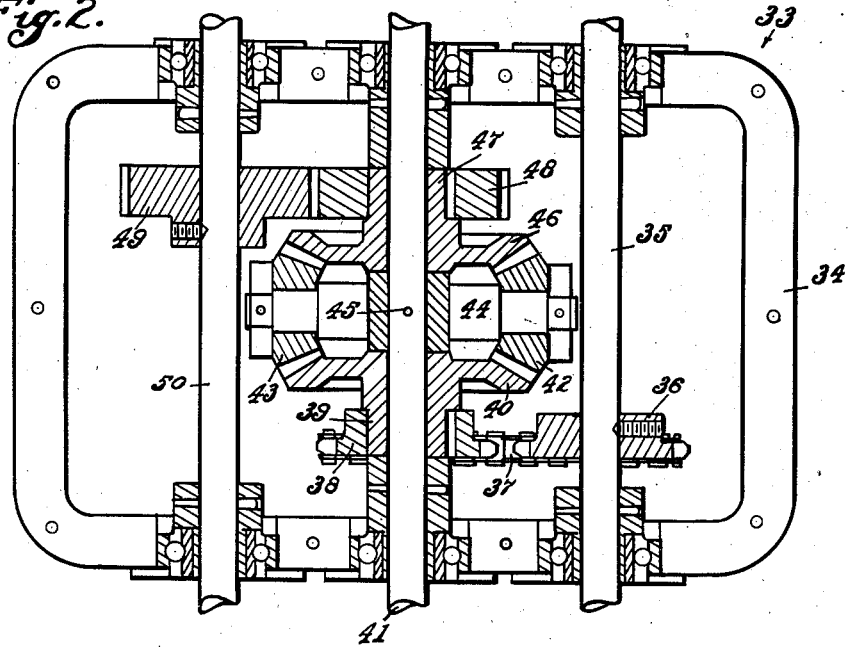
Fig. 2 is an enlarged plan view, partly in section, of a differential mechanism forming a part of the organization.

Referring more particularly to Figs. 1 and 2, it will be seen that I have illustrated a web or strip 10 of material to be wound, said web being forwarded, at constant velocity, by cooperating rolls 11 and 12. A constant speed motor 13 is connected to drive a sprocket 14 through the medium of a chain 15, said sprocket 14 being rigid with a second sprocket 16, which is connected, by a chain 17, to drive a sprocket 18 rigid with the forwarding roll 11.

Said roll 11 likewise carries a pulley (not shown) upon which is mounted a belt 19 which is mounted also upon a pulley 20 carried by the input shaft 21 of a variable speed transmission, indicated generally by the reference numeral 22. Said transmission 22 is an incremental type variable speed transmission which is preferably of the well known Reeves form.

Figure 4:
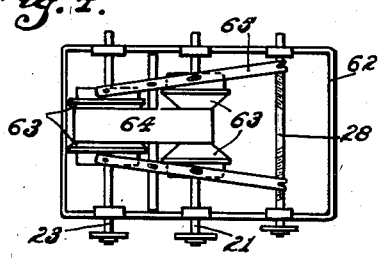
Fig. 4 is a diagrammatic plan view of a Reeves transmission.

In Fig. 4 I have diagrammatically illustrated such a transmission which, as will be seen, comprises a pair of parallel shafts 21 and 23 journalled in a casing 62, each shaft carrying a pair of coned discs 63 which form expansible V-pulleys. Said pulleys are operatively connected by an edge-active belt 64; and the respective discs are adjustable by levers 65 operable by rotation of a screw shaft 28.

The output shaft 23 of said transmission 22 carries a sprocket 24 which is connected, by a chain 25, to drive a sprocket 26 carried upon the winding roll 27. The speed ratio between the shafts 21 and 23 is variable by rotation of the usual screw shaft 28 of the transmission. It is the object of the illustrated organization to maintain a constant tension in the portion 29 of the web or strip 10 which lies between the winding roll 27 and an idler 30. The tension of the belt 19 is variable by adjustment of a tensioning roll 31 which may be moved by operation of a screw 32.

A differential mechanism 33, forming an element of the control organization, is illustrated in detail in Fig. 2. As is clearly shown in said figure, said differential mechanism comprises a casing 34 in which is journalled a shaft 35 carrying a sprocket 36 connected, by a chain 37, with a sprocket 38 keyed to the elongated hub 39 of a beveled gear 40. Said beveled gear 40 is journalled upon a second shaft 41 journalled in the casing 34, and meshes with a pair of beveled gears 42 and 43 which are journalled upon a carrier 44 suitably secured to the shaft 41, as by a pin 45. Said gears 42 and 43 mesh, also, with a beveled gear 46 journalled upon the shaft 41 and having an elongated hub 47 to which is keyed a gear 48 meshing with a gear 49 mounted upon a third shaft 50 which is journalled in the casing 34.

It will be seen that, if the shafts 35 and 50 are driven at the same velocity in the same direction, the shaft 41 will remain stationary; but that, if the shaft 35 is driven at a velocity greater than that of the shaft 50, in a counter clockwise direction, as viewed in Fig. 1, the shaft 41 will be rotated, in a counter clockwise direction, at a speed which increases as the speed differential between the shafts 35 and 50 increases.

Correspondingly, if the shaft 50 is rotated in a counter clockwise direction at a speed greater than the speed of the shaft 35, the shaft 41 will be rotated in a clockwise direction at a speed which increases as the speed differential between the shafts 35 and 50 increases.

In the organization of Fig. 1, a chain 51 connects a third sprocket (not shown) rigid with the sprocket 14 to drive a sprocket 52 carried by the differential shaft 35. A chain 53 connects a sprocket 54 on the transmission shaft 21 with a sprocket 55 on the differential shaft 50; and a chain 56 connects a sprocket 57 carried on the transmission screw shaft 28 with a sprocket 58 carried on the differential shaft 41. Preferably, a friction clutch is interposed between the sprocket 57 and the shaft 28.

Obviously, if the roll 11 is driven at constant speed, and if a constant tension is to be maintained in the web or strip between the winding roll 27 and the idler 30, the angular velocity of the winding roll 27 must be progressively decreased as the material being wound builds up on the winding roll to increase the effective diameter of the winding roll. Assuming that the parts are in a suitable position for starting, the motor 13 will drive the feeding roll 11 and the shaft 35 at constant speed. The belt 19 will drive the shaft 21 of the transmission, whereby the shaft 23 will be driven; and the chain 25 will drive the roll 27 at a speed dependent upon the setting of the transmission. As the material being wound begins to build up on the winding roll, there is, of course, a tendency for the peripheral velocity of the effective surface of the winding roll to increase; but, since the winding roll is connected to the shaft 23 by a chain 25, since the peripheral velocity of the roll 11 is constant, and since the web 10 is inelastic, the peripheral velocity of the effective surface of the winding roll cannot increase. There must, therefore, be a slippage somewhere in the organization.

It is well known that the degree of tension of a belt of given dimensions and of given material operating upon pulleys of given material determines the degree of torque transmissible by that belt from one pulley to the other. If an effort is made to transmit a greater degree of torque, the belt will slip, and will continue to deliver only that known degree of torque which is dependent upon dimensions and material.

It follows that, if the belt 19 is maintained under a predetermined tension, adjustable by the screw 32, only a given degree of torque will be transmitted from the feed roll 11 to the input shaft 21 of the transmission 22.

Therefore, as the effective periphery of the winding roll 27 increases, the angular velocity of the winding roll is necessarily reduced, which results in reduction of the angular velocity of the shaft 23, and so a reduction in the angular velocity of the shaft 21. Since the shaft 21 is connected to the differential shaft 50, the speed of the shaft 50 is correspondingly reduced; and, since the speed of the differential shaft 35 is constant, the shaft 41 will be rotated in a counterclockwise direction to rotate the screw shaft 28 of the transmission in a corresponding direction to effect an adjustment in the transmission which decreases the speed of the shaft 23 with respect to the speed of the shaft 21.

In other words, the parts are so designed and proportioned that, when the shaft 21 is driven without belt slip, the resultant speed of the shaft 50 is slightly greater than the speed of the shaft 35, so that the shaft 41 will be rotated in a clockwise direction to increase the speed of the shaft 23 with respect to the shaft 21. However, when the desired tension is applied to the material 10 in the region 29, there will be a slippage of the belt 19 which would, if the peripheral speed of windup roll 27 were maintained constant, drive the shaft 50 at a speed exactly equal to the speed of the shaft 35, thus holding the shaft 41 against rotation. Since, however, the effective periphery of the winding roll 27 is constantly increasing, there is a constant tendency to increase the degree of slippage of the belt 19, so that the shaft 21 is held against rotation at that optimum speed, the degree of slippage of the belt being increased. Such increase in slippage further reduces the speed of the shaft 50 to cause the shaft 41 to rotate in a counterclockwise direction which effects an adjustment of the parts of such character as to increase the speed of the shaft 21 with respect to the speed of the shaft 23 (or, in other words, decrease the speed of the shaft 23 with respect to the speed of the shaft 21). That adjustment is, of course, of the type which, if the speed of the shaft 21 were held constant, would cause a reduction in the speed of the shaft 23.

Figure 3:
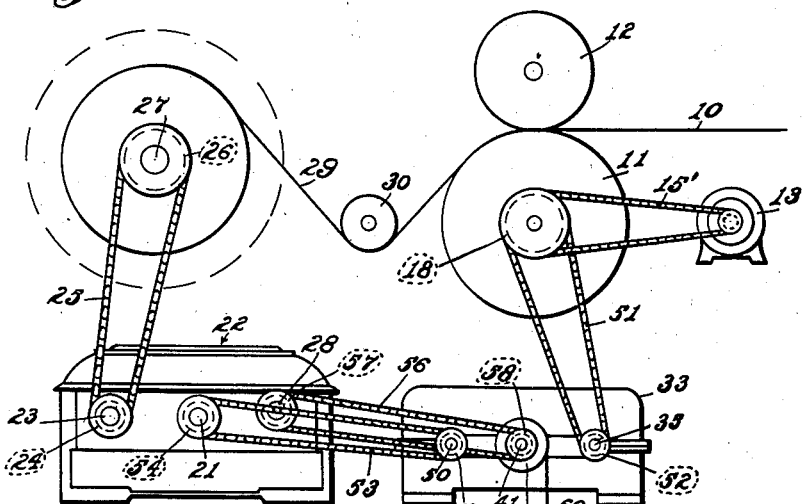
Fig. 3 is a reduced more or less diagrammatic view, similar to Fig. 1, but illustrating a different embodiment of the invention.

In Fig. 3, the parts are quite similar to the parts of the organization of Fig. 1. As in Fig. 1, the web or strip material 10 is forwarded by cooperating feeding rolls 11 and 12, the roll 11 being driven, by motor 13, through chain 15' engaging a sprocket 18 on the forwarding roll 11. As in Fig. 1, the output shaft 23 of the transmission 22 drives the feed roll 27 through sprockets 24 and 26 and chain 25. As before, it is desired to maintain a constant tension in a portion 29 of the web 10 between the feed roll 27 and the idler roll 30.

The differential mechanism 33 has its shaft 35 driven by a chain 51 cooperating with the sprocket 52 on said shaft and with a sprocket (not shown) on the forwarding roll 11. The differential shaft 41 is connected to drive the transmission screw shaft 28, through the medium of sprockets 57 and 58 and chain 56.

In the organization of Fig. 3, however, the input shaft 21 of the transmission 22 is driven, by a chain 53 engaging sprockets 54 and 55 on transmission shaft 21 and differential shaft 50, respectively. In this organization, the degree of torque transmitted is measured or determined by a weight 61 suspended from a cable 60 wound upon a drum 59 carried by the shaft 41 of the transmission 33.

It will be obvious that, in the absence of some force-applying means such as the weight 61, no torque would be transmitted through the differential to the transmission 22. That is, the motor 13 being energized to drive the feed roll 11 and the differential shaft 35 in a counter clockwise direction, if there were any load at all upon the transmission 22 and if the shaft 41 were free, the shaft 50, gear 49, gear 48, and beveled gear 46 would remain stationary, and the shaft 41 would rotate rapidly in a counter clockwise direction. The weight 61, however, acts as a brake tending to hold the shaft 41 against counter clockwise rotation, and exerting that tendency in a predetermined and limited degree. So long as the load upon the shaft 50 is just exactly sufficient to balance that braking effect of the weight 61, the shaft 41 will remain stationary. The moment the load upon the shaft 50 exceeds that predetermined value, however, the shaft 41 will be rotated in a counter clockwise direction at a speed dependent upon the degree in which the load upon the shaft 50 exceeds that predetermined value; and correspondingly, if the load upon the shaft 50 is less than that predetermined value, the shaft 41 will rotate in a clockwise direction.

It will be seen, therefore, that the weight 61, suspended from the cable 60 wound upon the drum 59 constitutes a device for measuring the load exerted upon the shaft 50 (or, in other words, the degree of torque transmitted by the shaft 50); and it will be seen that, if the tension in the portion 29 of the web 10 exceeds a predetermined value, the shaft 41 will be rotated in a counter clockwise direction to rotate the shaft 28 of the transmission to adjust the speed ratio between the shafts 21 and 23 thereof in the manner hereinabove described.

In the organization of Fig. 3, as in the organization of Fig. 1, if the motor 13 is operated at a time when the windup roll 27 is doing no work, the shaft 41 will be rotated in a clockwise direction to increase the speed of the shaft 23 with respect to the speed of the shaft 21, thereby bringing the transmission into position for starting.

It will be seen that the two organizations illustrated in the present application have several characteristics in common. In each, there is a mechanism which may be described as a torque measuring device which is effective, upon a variation in the torque exerted upon the winding roll, to adjust the transmission 22 to compensate for that variation and to return the parts to a position in which the predetermined optimum torque is exerted upon the winding roll. Each of the illustrated organizations includes a variable speed transmission and a differential mechanism, one shaft of the differential mechanism being driven at constant speed, another shaft of the differential mechanism being operated at a speed directly proportional to the speed of the input shaft of the transmission, and the third shaft of the differential being operated, in response to the creation of a differential between the speeds of the first two shafts of said differential mechanism, to adjust the parts of the transmission.

Each of the organizations is so designed as to effect, substantially continuously, incremental variations in the adjustment of the parts of the transmission in order to maintain constant the tension of the portion 29 of the web or strip 10.

It will be apparent to anyone skilled in the art that the organization herein disclosed may also be used to maintain a constant optimum tension upon that portion of the strand 10 indicated by the numeral 29, when the whole organization is being driven in the opposite direction, so that the roll 27 is an unwinding roll of material. When it is to be so used, the shifting shaft 28 will be reversed and the motor 13 will be operated in a clockwise direction, driving the sprockets 14, 16, 18, and 52, in the same direction. As the roll 27 decreases in diameter, the constant lineal velocity of strand 10 will cause an increase in the angular velocity of the roll 27, which increase in angular velocity will cause an increase in the angular velocity of the shafts 23, 21, and 50. The pulley 20 will thereby be caused to slip ahead of the belt 19; and this increase in the velocity of shafts 21 and 50 relative to the constant velocity of shaft 35 will cause the shaft 41 to rotate in a counter clockwise direction to change the ratio within the variable speed transmission 22 to effect a decrease in the angular velocity of shaft 21, thereby returning the organization momentarily to equilibrium. By the term "storage roll", as used in the appended claims, I intend to refer to a roll upon which material is wound during the operation of the claimed organization, or a roll from which material is unwound during such operation.

I claim as my invention:

1. In a device of the class described, a roll for forwarding a strand of material, a storage roll for said material, means for driving said forwarding roll at constant speed, and means for maintaining a constant tension on said material between said forwarding roll and said storage roll, comprising a variable speed transmission including an input shaft driven from said forwarding roll driving means, an output shaft connected to drive said storage roll, and a torque-measuring device connected between said driving means and said input shaft and operable to determine the degree of torque transmitted by said output shaft, said torque-measuring device comprising a rotatable element synchronized with said forwarding roll, a rotatable element synchronized with said transmission input shaft, and an element rotatable in opposite directions, in response to variations in angular velocity, between said rotatable elements, to vary oppositely the speed ratio between said transmission input and output shafts.

2. In a device of the class described, a roll for forwarding a strand of material, a storage roll for said material, means for driving sad forwarding roll at constant speed, and means for maintaining a constant tension on said material between said forwarding roll and said storage roll, comprising a variable speed transmission including an input shaft and an output shaft, said output shaft being connected to drive said storage roll, a torque-measuring device driven at a speed constantly proportional to the speed of said forwarding roll and connected to drive said input shaft for determining the degree of torque applied to said transmission, and means for adjusting the speed ratio between said input and output shafts in response to variations in the power transmitted by said transmission.

3. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a slipping belt connecting said driving means to drive said input shaft, a differential mechanism comprising a first rotatable element, a first beveled gear operatively connected thereto, a second rotatable element, a second beveled gear operatively connected thereto, a third rotatable element, a carrier operatively connected thereto and carrying two beveled gears each meshing with said first and second beveled gears, means operatively connecting said first rotatable element with said driving means, means operatively connecting said second rotatable element with said input shaft, and means operatively connecting said third rotatable element to shift said shiftable element.

4. In a device of the class described, a roll for forwarding a strand of material, a storage roll for said material, means for driving said forwarding roll at constant speed, a variable speed transmission, comprising two shafts, means for transmitting power between said shafts and an element shiftable to vary the speed ratio between said shafts, means providing a driving connection between one of said shafts and said storage roll, a torque-limiting power-transmission means connecting said driving means to the other of said shafts, a differential mechanism comprising two coaxial relatively rotatable members and a planetary member connecting said coaxial members and revoluble about the common axis thereof, means operatively connecting one of said members with said driving means, means operatively connecting another of said members with said other shaft, and means operatively connecting the third of said members to shift said shiftable element.

5. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a differential mechanism comprising a first rotatable element, a first beveled gear operatively connected thereto, a second rotatable element, a second beveled gear operatively connected thereto, a third rotatable element, a carrier operatively connected thereto and carrying two beveled gears each meshing with said first and second beveled gears, means operatively connecting said first rotatable element with said driving means, means operatively connecting said second rotatable element with said input shaft, means operatively connecting said third rotatable element to shift said shiftable element, and means associated with said third rotatable element and exerting thereon a substantially constant resistance to rotation thereof in at least one direction.

6. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, a differential mechanism comprising two coaxial relatively rotatable members and a planetary member connecting said coaxial members and revoluble about the common axis thereof, means operatively connecting one of said members with said driving means, means operatively connecting another of said members with the other of said shafts, means operatively connecting the third of said members to shift said shiftable element, and means associated with the third of said members and exerting thereon a substantially constant resistance to rotation thereof in at least one direction.

7. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, a differential mechanism comprising two coaxial relatively rotatable members and a planetary member connecting said coaxial members and revoluble about the common axis thereof, means operatively connecting one of said members with said driving means, means operatively connecting another of said members with the other of said shafts, means operatively connecting the third of said members to shift said shiftable element, and means associated with the third of said members and exerting thereon a substantially constant torque.

8. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a slipping belt connecting said driving means to drive said input shaft, a differential mechanism comprising a first shaft, a second shaft parallel thereto, a third shaft parallel to said first and second shafts and interposed therebetween, a carrier rigid with said third shaft and carrying two beveled gears positioned on opposite sides of said shaft, a third beveled gear loosely mounted on said third shaft and meshing with said first-mentioned two beveled gears, means providing a driving connection between said first shaft and said third beveled gear, a fourth beveled gear loosely mounted on said third shaft and meshing with said first-mentioned two beveled gears, means providing a driving connection between said second shaft and said fourth beveled gear, means operatively connecting said first shaft with said driving means, means operatively connecting said second shaft with said input shaft, and means operatively connecting said third shaft to shift said shiftable element.

9. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, torque-limiting power-transmission means connecting said driving means to the other of said shafts, a differential mechanism comprising a first shaft, a second shaft, a third shaft parallel to said first and second shafts, two relatively rotatable coaxial members and a planetary member connecting said coaxial members and revoluble about the common axis thereof, means providing a driving connection between said first shaft and one of said members, means providing a driving connection between said second shaft and another of said members, means providing a driving connection between said third shaft and the third of said members, means operatively connecting said first shaft with said driving means, means operatively connecting said second shaft with said other transmission shaft, and means operatively connecting said third shaft to shift said shiftable element.

10. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a slipping belt connecting said driving means to drive said input shaft, a differential mechanism comprising a first shaft, a second shaft parallel thereto, a third shaft parallel to said first and second shafts and interposed therebetween, a carrier rigid with said third shaft and carrying two beveled gears positioned on opposite sides of said shaft, a third beveled gear loosely mounted on said third shaft and meshing with said first-mentioned two beveled gears, a fourth beveled gear loosely mounted on said third shaft and meshing with said first-mentioned two beveled gears, means providing driving connections between said first shaft and said third beveled gear and between said second shaft and said fourth beveled gear, said connecting means being of such character that rotation of said first and second shafts in the same direction will cause rotation of said third and fourth beveled gears in opposite directions, means operatively connecting said first shaft with said driving means, means operatively connecting said second shaft with said input shaft, and means operatively connecting said third shaft to shift said shiftable element.

11. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, torque-limiting power-transmitting means connecting said driving means to the other of said shafts, a differential mechanism comprising two relatively rotatable coaxial members and a planetary member connecting said coaxial members and revoluble about the common axis thereof, means providing driving connections between two of said members and said driving means and said other shaft, respectively, said connecting means being of such character that rotation of said driving means and said other shaft in the same direction will cause rotation of said two members in opposite directions with respect to each other, and means operatively connecting the third of said members to shift said shiftable element.

12. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, torque-limiting power-transmitting means connecting said driving means to the other of said shafts, a differential mechanism comprising a first shaft, a second shaft, a third shaft parallel to said first and second shafts, two relatively rotatable coaxial members and a planetary member connecting said coaxial members and revoluble about the common axis thereof, means providing driving connections between said first shaft and one of said members and between said second shaft and another of said members, said connecting means being of such character that rotation of said first and second shafts in the same direction will cause rotation of said two members in opposite directions with respect to each other, means providing a driving connection between said third shaft and the third of said members, means operatively connecting said first shaft with said driving means, means operatively connecting said second shaft with said other transmission shaft, and means operatively connecting said third shaft to shift said shiftable element.

13. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a slipping belt connecting said driving means to drive said input shaft, a differential mechanism comprising a first shaft, a second shaft parallel thereto, a third shaft parallel to said first and second shafts and interposed therebetween, a carrier rigid with said third shaft and carrying two beveled gears positioned on opposite sides of said shaft, a third beveled gear loosely mounted on said third shaft and meshing with said first-mentioned two beveled gears, a fourth beveled gear loosely mounted on said third shaft and meshing with said first-mentioned two beveled gears, means providing driving connections between said first shaft and said third beveled gear and between said second shaft and said fourth beveled gear, one of said connecting means comprising meshing gears on one of said shafts and its associated beveled gear, and the other of said connecting means comprising chain-connected sprockets on the other of said shafts and its associated beveled gear, means operatively connecting said first shaft with said driving means, means operatively connecting said second shaft with said input shaft, and means operatively connecting said third shaft to shift said shiftable element.

14. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a differential mechanism comprising a first shaft, a second shaft parallel thereto, a third shaft parallel to said first and second shafts and interposed therebetween, a carrier rigid with said third shaft and carrying two beveled gears positioned on opposite sides of said shaft, a third beveled gear loosely mounted on said third shaft and meshing with said first-mentioned two beveled gears, means providing a driving connection between said first shaft and said third beveled gear, a fourth beveled gear loosely mounted on said third shaft and meshing with said first-mentioned two beveled gears, means providing a driving connection between said second shaft and said fourth beveled gear, means operatively connecting said first shaft with said driving means, means operatively connecting said second shaft with said input shaft, means operatively connecting said third shaft to shift said shiftable element, and means associated with said third shaft and exerting thereon a substantially constant resistance to rotation thereof in at least one direction.

15. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, a differential mechanism comprising a first shaft, a second shaft, a third shaft parallel to said first and second shafts, two relatively rotatable coaxial members and a planetary member connecting said coaxial members and revoluble about the common axis thereof, means providing a driving connection between said first shaft and one of said members, means providing a driving connection between said second shaft and another of said members, means providing a driving connection between said third shaft and the third of said members, means operatively connecting said first shaft with said driving means, means operatively connecting said second shaft with the other of said transmission shafts, means operatively connecting said third shaft to shift said shiftable element, and means associated with said third shaft and exerting thereon a substantially constant resistance to rotation theerof in at least one direction.

16. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, a differential mechanism comprising a first shaft, a second shaft, a third shaft parallel to said first and second shafts, two relatively rotatable coaxial members and a planetary member connecting said coaxial members and revoluble about the common axis thereof, means providing a driving connection between said first shaft and one of said members, means providing a driving connection between said second shaft and another of said members, means providing a driving connection between said third shaft and the third of said members, means operatively connecting said first shaft with said driving means, means operatively connecting said second shaft with the other of said transmission shafts, means operatively connecting said third shaft to shift said shiftable element, and means associated with said third shaft and exerting thereon a substantially constant torque.

17. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a differential mechanism comprising a first shaft, a second shaft parallel thereto, a third shaft parallel to said first and second shafts and interposed therebetween, a carrier rigid with said third shaft and carrying two beveled gears positioned on opposite sides of said shaft, a third beveled gear loosely mounted on said third shaft and meshing with said first-mentioned two beveled gears, a fourth beveled gear loosely mounted on said third shaft and meshing with said first-mentioned two beveled gears, means providing driving connections between said first shaft and said third beveled gear and between said second shaft and said fourth beveled gear, said connecting means being of such character that rotation of said first and second shafts in the same direction will cause rotation of said third and fourth beveled gears in opposite directions, means operatively connecting said first shaft with said driving means, means operatively connecting said second shaft with said input shaft, means operatively connecting said third shaft to shift said shiftable element, and means associated with said third shaft and exerting thereon a substantially constant resistance to rotation thereof in at least one direction.

18. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, a differential mechanism comprising a first shaft, a second shaft, a third shaft parallel to said first and second shafts, two relatively rotatable coaxial members and a planetary member connecting said coaxial members and revoluble about the common axis thereof, means providing driving connections between said first shaft and one of said members and between said second shaft and another of said members, said connecting means being of such character that rotation of said first and second shafts in the same direction will cause rotation of said two members in opposite directions with respect to each other, means providing a driving connection between said third shaft and the third of said members, means operatively connecting said first shaft with said driving means, means operatively connecting said second shaft with the other of said transmission shafts, means operatively connecting said third shaft to shift said shiftable element, and means associated with said third shaft and extending thereon a substantially constant resistance to rotation thereof in at least one direction.

19. In a device of the class described, a roll for forwarding a strand of material, a storage roll for said material, means for driving said forwarding roll at constant speed, a variable speed transmission, comprising two shafts, means for transmitting power between said shafts, and an element shiftable to vary the speed ratio between said shafts, means connecting one of said shafts to said storage roll, a differential mechanism comprising a first shaft, a second shaft, a third shaft parallel to said first and second shafts, two relatively rotatable coaxial members and a planetary member connecting said coaxial members and revoluble about the common axis thereof, means providing driving connections between said first shaft and one of said members and between said second shaft and another of said members, said connecting means being of such character that rotation of said first and second shafts in the same direction will cause rotation of said two members in opposite directions with respect to each other, means providing a driving connection between said third shaft and the third of said members, means operatively connecting said first shaft with said driving means, means operatively connecting said second shaft with the other of said transmission shafts, means operatively connecting said third shaft to shift said shiftable element, and means associated with said third shaft and exerting thereon a substantially constant torque.

20. In a device of the class described, a roll for forwarding a strand of material, a storage roll for said material, means for driving said forwarding roll at constant speed, a variable speed transmission, comprising an input shaft, an output shaft, and an element shiftable to vary the speed ratio between said shafts, means connecting said output shaft to said storage roll, a differential mechanism comprising a first shaft, a second shaft parallel thereto, a third shaft parallel to said first and second shafts and interposed therebetween, a carrier rigid with said third shaft and carrying two beveled gears positioned on opposite sides of said shaft, a third beveled gear loosely mounted on said third shaft and meshing with said first-mentioned two beveled gears, a fourth beveled gear loosely mounted on said third shaft and meshing with said first-mentioned two beveled gears, means providing driving connections between said first shaft and said third beveled gear and between said second shaft and said fourth beveled gear, one of said connecting means comprising meshing gears on one of said shafts and its associated beveled gear, and the other of said connecting means comprising chain-connected sprockets on the other of said shafts and its associated beveled gear, means operatively connecting said first shaft with said driving means, means operatively connecting said second shaft with said input shaft, means operatively connecting said third shaft to shift said shiftable element, and means associated with said third shaft and exerting thereon a substantially constant resistance to rotation thereof in at least one direction.

21. In a device of the class described, a prime mover, a variable speed transmission, comprising an input shaft, an output shaft, and an element shiftable to vary the speed ratio between said input and output shafts, a differential mechanism comprising a first rotatable element, a first beveled gear operatively connected thereto, a second rotatable element, a second beveled gear operatively connected thereto, a third rotatable element, a carrier operatively connected thereto and carrying two beveled gears each meshing with said first and second beveled gears, an element to be driven, means connecting the output shaft of said transmission to drive said last-mentioned element, a slipping belt connecting said prime mover to drive the input shaft of said transmission, means connecting said prime mover to drive the first rotatable element of said differential mechanism, means connecting said transmission input shaft to drive the second rotatable element of said differential mechanism, and means connecting the third rotatable element of said differential mechanism to shift said shiftable element.

22. In a device of the class described, a prime mover, a variable speed transmission, comprising two shafts, means for transmitting power between said shafts, and an element shiftable to vary the speed ratio between said shafts, a differential mechanism comprising two relatively rotatable coaxial members and a planetary member connecting said coaxial members and revoluble about the common axis thereof, an element to be driven, means providing a driving connection between one of the transmission shafts and said last-mentioned element, torque-limiting power-transmitting means connecting said prime mover to the other shaft of said transmission, means connecting said prime mover to drive one of said members, means connecting said other transmission shaft to another of said members, and means connecting the third of said members to shift said shiftable element.

23. In a device of the class described, a prime mover, a variable speed transmission, comprising an input shaft, an output shaft, and an element shiftable to vary the speed ratio between said input and output shafts, a differential mechanism comprising a first rotatable element, a first beveled gear operatively connected thereto, a second rotatable element, a second beveled gear operatively connected thereto, a third rotatable element, a carrier operatively connected thereto and carrying two beveled gears each meshing with said first and second beveled gears, an element to be driven, means connecting said prime mover to drive the first rotatable element of said differential mechanism, means connecting the second rotatable element of said differential mechanism to drive said transmission input shaft, means connecting said transmission output shaft to drive said element to be driven, means connecting the third rotatable element of said differential mechanism to shift said shiftable element, and means associated with the third rotatable element of said differential mechanism and exerting thereon a substantially constant resistance to rotation thereof in at least one direction.

24. In a device of the class described, a prime mover, a variable speed transmission, comprising two shafts, means for transmitting power between said shafts, and an element shiftable to vary the speed ratio between said shafts, a differential mechanism comprising two relatively rotatable coaxial members and a planetary member connecting said coaxial members and revoluble about the common axis thereof, an element to be driven, means connecting said prime mover to drive one of said members, means connecting another of said members to one of said transmission shafts, means connecting the other of said transmission shafts to said element to be driven, means connecting the third of said members to shift said shiftable element, and means associated with said third member and exerting thereon a substantially constant resistance to rotation thereof in at least one direction.

25. In a device of the class described, a prime mover, a variable speed transmission, comprising two shafts, means for transmitting power between said shafts, and an element shiftable to vary the speed ratio between said shafts, a differential mechanism comprising two relatively rotatable coaxial members and a planetary member connecting said coaxial members and revoluble about the common axis thereof, an element to be driven, means connecting said prime mover to drive one of said members, means connecting another of said members to one of said transmission shafts, means connecting the other of said transmission shafts to said element to be driven, means connecting the third of said members to shift said shiftable element, and means associated with said third member and exerting thereon a substantially constant torque.

WILLIAM R. PERRY.